Patented Aug. 2, 1949

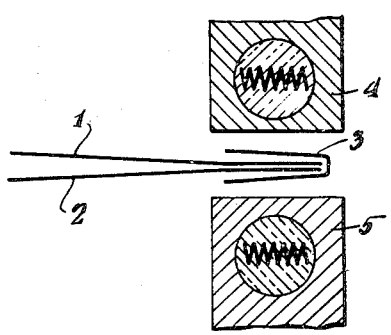
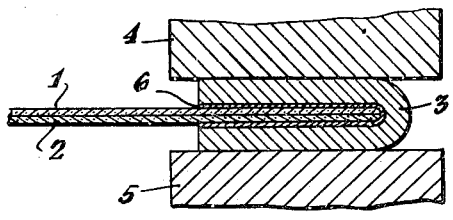
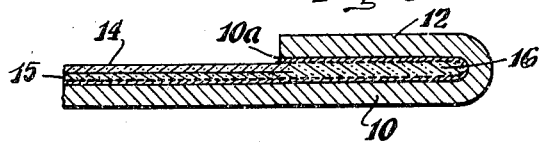
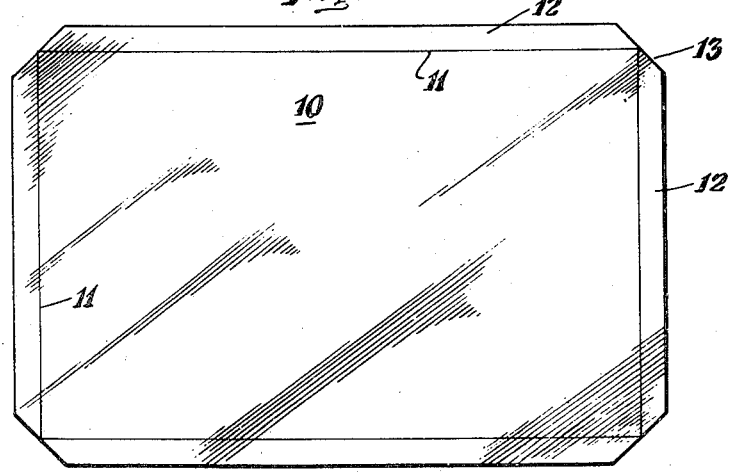
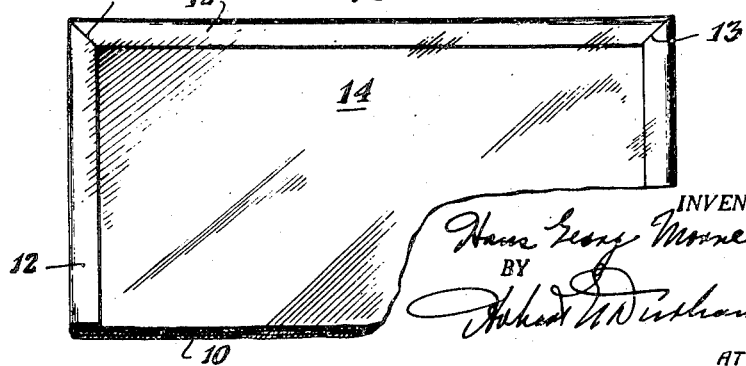

2,478,121

UNITED STATES PATENT OFFICE 2,478,121

PROCESS OF HEAT SEALING

Hans G. Morner, New York, N. Y.

Application March 16, 1945, Serial No. 583,121

5 Claims. (Cl. 154—116)

The present invention relates to a novel and improved process of heat sealing thermoplastic sheets or films.

Objects and advantages of the invention will be set forth in part hereinafter and in part will be obvious herefrom, or may be learned by practice with the invention, the same being realized and attained by means of the processes, steps and combinations pointed out in the appended claims.

The invention consists in the novel steps, constructions, processes, combinations and improvements herein shown and described.

The accompanying drawings, referred to herein and constituting a part hereof, illustrate one form of apparatus for carrying out the process of the invention, and together with the description, serve to explain the principles of the invention.

Of the drawings:

Figure 1 is a diagram showing in section the arrangement of parts in the process of the present invention;

Figure 2 is an enlarged sectional view showing the films to be joined, and the heating members more in detail;

Figure 3 is a plan view showing a sheet on which the films may be assembled;

Figure 4 is a fragmentary view showing the edges of the sheet folded over; and

Figure 5 is a sectional view showing an edge of the assembly shown in Figure 4.

The present invention has for its object the provision of a novel and improved process of heat sealing thermoplastic resin sheets or foils, such as "Vinylite" (vinyl ester polymers) and other thermoplastic material. The invention provides a process of heat sealing two or more sheets together at desired points or areas with a bond which has a strength equal to or exceeding that of the sheet or foil, retaining the flexibility and other characteristics of the material and without contaminating it in any way. A further object of the invention is the provision of a novel and improved sealing process which can be carried out much more expeditiously than processes involving the use of cement, such as are now usually used.

In accordance with the present invention a method is provided for joining together, expeditiously and firmly, two sheets of thermoplastic material or foil. The sheets of material to be joined, of "Vinylite" or similar thermoplastic sheet material, are positioned together with their edges to be joined in substantial register and the edges are then inserted between and into the fold of a longitudinally folded strip of material the inner adjacent faces of which are of smooth impervious material, while the main support is a folded strip of flexible material having substantial heat insulating properties. The fold of the material forms a jaw which accurately registers the edges, and when so assembled they are placed between heated platens heated to about 230° F. to 250° F. and are subjected by them to firm but not heavy pressure for a few seconds, after which the sheets of material are removed from the fold and have been heat sealed together.

The impervious facing of the paper strip prevents sticking of the foil to the folded strip, while the paper serves to prevent undue local heating of the edges to be joined.

The sheets or foils to be joined may be as thin as .003" or less or as thick as .025" or more.

The folded strip preferably comprises a strip of paper from .003" to .010" in thickness faced on its inner adjacent faces with a substantially smooth and impervious layer of metal foil or burnished metal powder, such as aluminium, bronze or copper.

The heating platens are preferably brass, heated to a uniform temperature by resistance heaters and thermostatically controlled to maintain the optimum temperature. They are mounted to remain in parallelism and may be moved into firm contact with the folded strip and foil to exert a pressure of a pound or more per lineal inch on the edges to be heat sealed.

Figure 1 is a schematic view showing the Vinylite sheets 1 and 2 with their edges in register and held in register by the folded strip 3, the inner faces of which are of metal foil, positioned between the heated platens 4 and 5 which will press together, heat and seal the edges of the sheets 1 and 2 in about four to six seconds.

In Figure 2, there is shown the foil coating 6 on the strip 3 just prior to the making of the heat seal.

Where a large number of pieces of similar shape are to be heat sealed, the foil coated sheet is preferably cut somewhat larger than the sheets to be joined, the edges are scored to fold at the edges of the thermoplastic sheets, and the corners are cut so as to abut when folded. On such foil sheets, the thermoplastic sheets may be assembled ready for heat sealing thus facilitating production by making possible the complete assembly before the heat sealing operation.

Figure 3 shows a foil covered sheet 10 for assembling rectangular sheets or film of thermoplastic material to be heat sealed along their edges. The sheet 10 is scored along lines 11 which define an area the same as the thermoplastic sheets to be handled, leaving margins 12 which may be folded over to enclose the edges of the thermoplastic sheets. The corners are cut, as at 13, so that when folded the marginal edges meet at the corners. Figure 4 shows the assembly ready to be heat sealed along its edges.

Figure 5 shows the thermoplastic sheets 14, 15 which have been fused together, at 16, and positioned on the sheet 10, having a foil face 10a, and held in register before heat sealing by the marginal edge 12.

The invention in its broader aspects is not limited to the specific processes and steps shown and described but departures may be made therefrom within the scope of the accompanying claims without departing from the principles of the invention and without sacrificing its chief advantages.

What I claim is:

1. A process for heat sealing flexible thermoplastic sheets or films, including positioning the edges of a plurality of said sheets or films in register into the fold of an impervious coated heat insulating strip and subjecting the fold and edges to heat and pressure to seal said edges together.

2. A process for heat sealing flexible thermoplastic sheets or films, including positioning the edges of a plurality of said sheets or films in register into the fold of a metal foil faced paper member and subjecting the fold and edges to heat and pressure to seal said edges together.

3. A process for heat sealing flexible thermoplastic sheets or films, including positioning the edges of a plurality of said sheets or films in register, placing the sheets or films on a foil faced sheet extending beyond the sheets or films along all edges, folding the marginal extensions over to enclose the sheet or foil edges and hold them assembled and in register and subjecting the marginal extensions and enclosed edges to heat and pressure sufficient to heat seal the enclosed edges together.

4. A process for heat sealing flexible thermoplastic sheets or films, including positioning the edges of a plurality of said sheets or films in register, placing the sheets or films on a flexible sheet of heat insulating material having an impervious facing and extending beyond the sheets or films along all edges, folding the marginal extensions over to enclose the sheet or foil edges and hold them assembled and in register and subjecting the marginal extensions and enclosed edges to heat and pressure sufficient to heat seal the enclosed edges together.

5. A process for heat sealing flexible thermoplastic sheets or films, including positioning contacting edges of a plurality of sheets or film between the adjacent faces of a single folded piece of impervious heat insulating material, and subjecting the edges and the heat insulating material to heat and pressure sufficient to seal the edges together.

HANS G. MORNER.

REFERENCES CITED

The following references are of record in the file of this patent:

UNITED STATES PATENTS

| Number | Name | Date |
| --- | --- | --- |
| 614,410 | Price | Nov. 15, 1898 |
| 1,734,287 | Cornell | Nov. 5, 1929 |
| 2,392,695 | Rohdin | Jan. 8, 1946 |